United States Patent
Yamada et al.

(10) Patent No.: US 7,740,317 B2
(45) Date of Patent: Jun. 22, 2010

(54) LOCK APPARATUS OF SEAT FOR VEHICLE

(75) Inventors: Yukifumi Yamada, Toyota (JP); Sadao Ito, Anjo (JP); Naoki Goto, Tokai (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/181,584

(22) Filed: Jul. 29, 2008

(65) Prior Publication Data

US 2009/0033138 A1 Feb. 5, 2009

(30) Foreign Application Priority Data

Aug. 3, 2007 (JP) ............... 2007-203409
Mar. 25, 2008 (JP) ............... 2008-078222

(51) Int. Cl.
*B60N 2/02* (2006.01)
(52) U.S. Cl. ............... 297/378.13; 296/65.17
(58) Field of Classification Search ........... 297/378.13; 296/65.17, 65.16
See application file for complete search history.

(56) References Cited

U.S. PATENT DOCUMENTS

| 5,566,431 | A * | 10/1996 | Haglund ........... 297/378.13 |
| 6,733,078 | B1 * | 5/2004 | Zelmanov ........... 297/378.13 |
| 7,044,552 | B2 | 5/2006 | Mueller et al. |
| 7,152,926 | B2 * | 12/2006 | Wrobel ........... 297/378.13 X |
| 7,188,906 | B2 * | 3/2007 | Christoffel et al. ..... 297/378.13 |
| 7,410,217 | B2 * | 8/2008 | Inoue et al. ........... 297/378.13 |
| 7,494,187 | B2 * | 2/2009 | Inoue et al. ........... 297/378.13 |

FOREIGN PATENT DOCUMENTS

| DE | 199 02 561 A1 | 8/2000 |
| JP | 11-321392 | 11/1999 |
| JP | 2005-7966 | 1/2005 |
| JP | 2005-329804 | 12/2005 |
| WO | WO 03/043848 A1 | 5/2003 |

* cited by examiner

*Primary Examiner*—Anthony D Barfield
(74) *Attorney, Agent, or Firm*—Oblon, Spivak, McClelland, Maier & Neustadt, L.L.P.

(57) ABSTRACT

A lock apparatus of a seat for a vehicle includes a striker, a base including a first groove portion, a hook including a second groove portion and pivoting between a lock position and an unlock position, a pawl restraining a pivotal movement of the hook towards the unlock position while allowing the pivotal movement of the hook towards the lock position, a cam member including a cam profile for allowing the pivotal movement of the hook towards the lock position and for restraining the pivotal movement of the hook towards the unlock position, and a first biasing member. When the hook is pivoted to the lock position, the striker is positioned between the rotational shaft of the hook and the rotational shaft of the pawl, and the pawl and the hook are engaged at an opposite position of the rotational shaft of the hook relative to the striker.

16 Claims, 9 Drawing Sheets

LOCK APPARATUS OF SEAT FOR VEHICLE

CROSS REFERENCE TO RELATED APPLICATIONS

This application is based on and claims priority under 35 U.S.C. §119 to Japanese Patent Applications 2007-203409 filed on Aug. 3, 2007, and 2008-078222 filed on Mar. 25, 2008, the entire contents of which are incorporated herein by reference.

FIELD OF THE INVENTION

The present invention generally relates to a lock apparatus of a seat for a vehicle.

BACKGROUND

There has been proposed a seat for a vehicle, of which a seatback portion of a backseat is tilted (retractable type), and/or which is detachable from a vehicle floor (detachable type), so as to reduce level difference on the vehicle floor inside the vehicle for effectively using a space inside the vehicle. Regarding such retractable type seat and detachable type seat, for example, the seat is secured on the vehicle floor, or at a side surface of the vehicle compartment, so as not to generate backlash when the seat is in a locked state. Therefore, when the seat is in the locked state, ride quality is not negatively affected. Further, the seat is rigidly structured so that the locked state may not be released by a large shock.

A lock apparatus of a seat, which includes a base secured at a lower portion of a seat (movable member) and a striker secured to a vehicle floor (fixed member), is disclosed in US7044552B1 (hereinafter, referred to as reference 1). A first groove portion is formed at the base so that the striker is engaged into the first groove portion. The striker is surrounded by an inner end of the first groove portion of the base and a side surface (rear side surface) of a second groove portion formed at a hook which is pivotably supported to the base, thereby shifting the seat apparatus to a locked state and securing the seat to the vehicle floor. In order to surround the striker by the first groove portion of the base and the second groove portion of the hook without backlash at the locked state of the lock apparatus, a load is applied on a cam member, which is pivotably supported to the base, by means of a spring applying biasing force in a direction for pressing the hook. Further, in addition to the cam member, a pawl is further employed for preventing a pivotal movement of the hook in a case where external force is applied to the striker in a direction to be away from the first groove portion of the base (second groove portion of the hook) when the lock apparatus is in the locked state.

As described above, according to the reference 1, the backlash is restrained by the cam member, and the resistance to the external force is reinforced by the pawl. Thus, the backlash of the lock apparatus in the locked state is restrained. In addition, the locked state of the lock apparatus is restrained from being released due to large shock (large impact), for example.

According to the lock apparatus disclosed in the reference 1, a rotational shaft of the cam member and a rotational shaft of the pawl are arranged to be coaxial. Further, the rotational shafts of the pawl and the cam member and a rotational shaft of the hook are arranged at one side relative to the striker to which the external force is applied. Therefore, in a case where the external force is applied to the striker in a direction towards an opening of the first portion (i.e., in a direction where the striker exits the first groove portion of the base and the second groove portion of the hook), the lock apparatus may not be strong enough to resist such external force because the cam member, the pawl and the hook are supported only at one side relative to the striker to resist such external force.

Further, the larger a length between the rotational shaft of the cam member and a surface (portion) thereof for contacting the hook is, the greater the efficiency for restraining the backlash becomes. Still further, the shorter a length between the rotational shaft of the pawl and a surface (portion) thereof for contacting the hook is, the greater the strength of the lock apparatus becomes. However, according to the lock apparatus disclosed in the reference 1, the rotational shafts of the pawl and the cam member are coaxially arranged, as described above. Therefore, in a case where the length from the cam member (pawl) to the hook is arranged to be larger so as to increase a performance for restraining the backlash, a performance for resisting the external force may be reduced. On the other hand, in a case where the length between from the pawl (cam member) to the hook is arranged to be smaller so as to increase the performance for resisting the external force, the backlash may not be restrained sufficiently.

Still further, because the cam member and the pawl are arranged coaxial, the cam member and the pawl are arranged to overlap with each other in a thickness direction of such components. In other words, centers of the hook and the cam member in the thickness direction thereof deviate, and further centers of the hook and the pawl in the thickness direction thereof deviate. Therefore, load for restraining the backlash and the external force applied to the striker are received at a position dislocated from the centers of the hook in the thickness direction. Accordingly, torsion moment is generated to the rotational shaft of the hook, and the performance of the cam member and the pawl may not be exerted for restraining the backlash and for resisting the external force.

A need thus exists for a lock apparatus of a seat for a vehicle, which is not susceptible to the drawback mentioned above.

SUMMARY OF THE INVENTION

According to an aspect of the present invention, a lock apparatus of a seat for a vehicle includes a striker, a base, a hook, a cam member, a first biasing member and a pawl. The striker is adapted to be securely provided at one of a movable member of the seat and a fixed member fixedly provided relative to the movable member. The base is adapted to be provided at the other of the movable member and the fixed member and includes a first groove portion for inserting the striker. The hook includes a second groove portion. Further, the hook is rotatably supported to the base about a rotational shaft so as to pivot between a lock position at which the striker is engaged with the first groove portion and the second groove portion and an unlock position at which the striker is released from the first groove portion and the second groove portion. The pawl is rotatably supported to the base about a rotational shaft to engage with and disengage from an engagement portion of the hook. The pawl restrains a pivotal movement of the hook towards the unlock position while allowing the pivotal movement of the hook towards the lock position by being engaged with the engagement portion of the hook. The cam member is rotatably supported to the base. The cam member includes a cam profile to be in cam contact with an operational portion formed at the hook for allowing the pivotal movement of the hook towards the lock position and for restraining the pivotal movement of the hook towards the unlock position. The first biasing member is employed for biasing the cam member to pivot in a direction in which the cam profile presses the operational portion of the hook. When the hook is pivoted to the lock position, the striker engaged with the first groove portion and the second groove portion is positioned between the rotational shaft of the hook and the rotational shaft of the pawl, and the pawl and the engagement portion of the hook are engaged at an opposite position of the rotational shaft of the hook relative to the striker for supporting the hook relative to the striker at the rotational shaft of the hook and at a position at which the pawl and the engagement portion of the hook are engaged.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of a lock apparatus 1 of a seat for a vehicle will be described hereinafter with reference to attached FIGS. 1 to 12. Herein, the lock apparatus 1 is mounted on a backseat 10 of the vehicle (serving as the seat for the vehicle).

Figure 1:
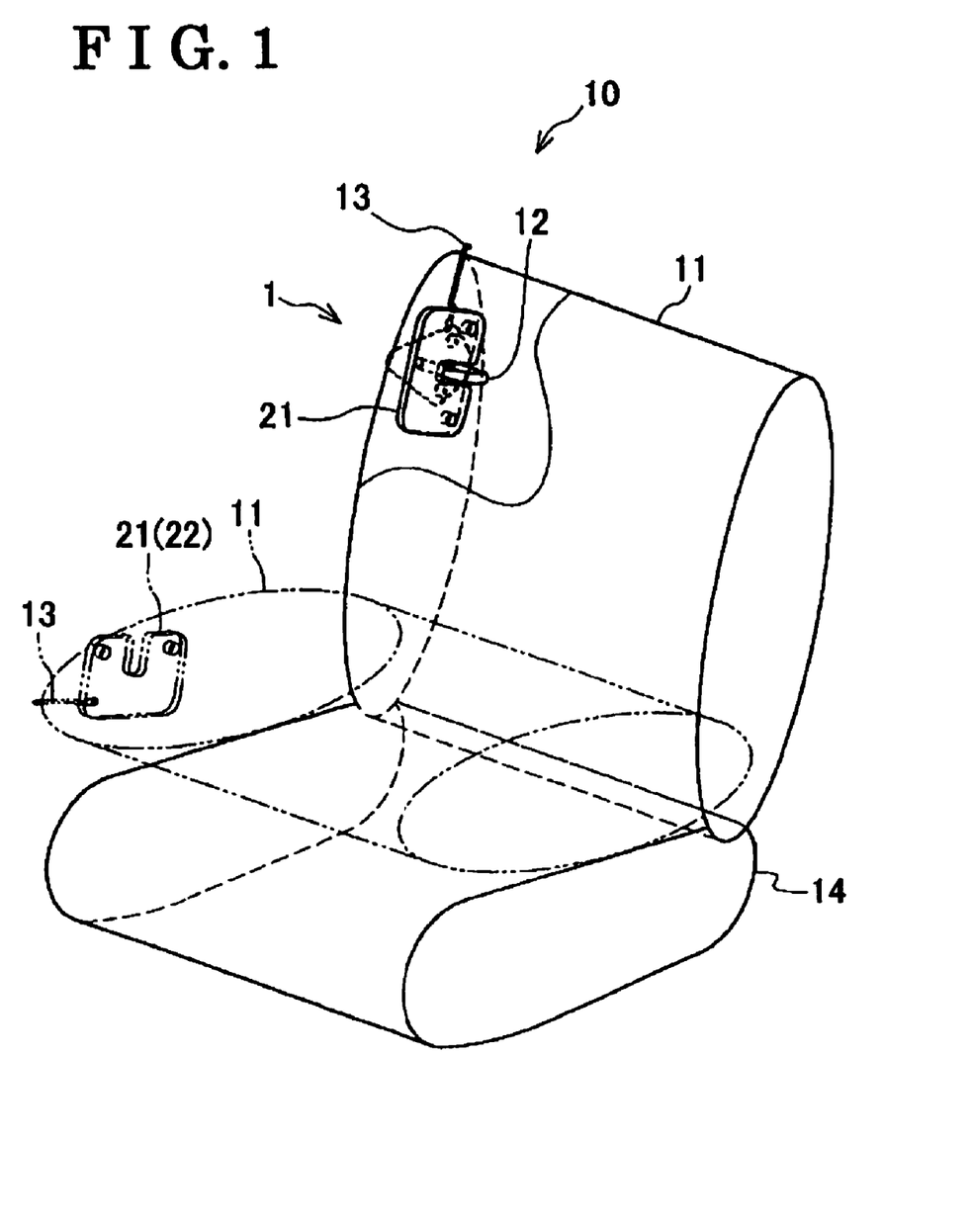
FIG. 1 is a perspective view illustrating a lock apparatus of a seat for a vehicle and a seat assembled with the lock apparatus, according to the embodiment.

As illustrated in FIG. 1, the lock apparatus 1 of the seat for the vehicle (hereinafter, referred to as lock apparatus 1) according to the embodiment includes a base 21 and a striker 12. The base 21 is secured to a side surface of a seatback 11 (serving as a movable member of the seat) of the backseat 10 (hereinafter, referred to as seat 10). The striker 12 is secured to a side surface of a vehicle compartment (serving as a fixed member fixedly provided relative to the movable member) at a position corresponding to the base 21 in a state where the seatback 11 is in an upright position (standing position). As illustrated in FIG. 1, a condition where the seatback 11 is secured at the side surface of the vehicle compartment as illustrated by a continuous line indicates a locked state of the lock apparatus 1. The locked state of the lock apparatus 1 is released by pulling a lever 13 which is assembled to the base 21, thus tilting the seatback 11 of the seat 10 towards a seat cushion 14. In FIG. 1, the tilted seatback 11, the base 21 secured to the tilted seatback 11 and the lever 13 (i.e., a released state of the lock apparatus 1) are indicated by dotted lines. Herein, as is apparent therefrom, the lever 13 is assembled to a sub base 22.

Figure 2:
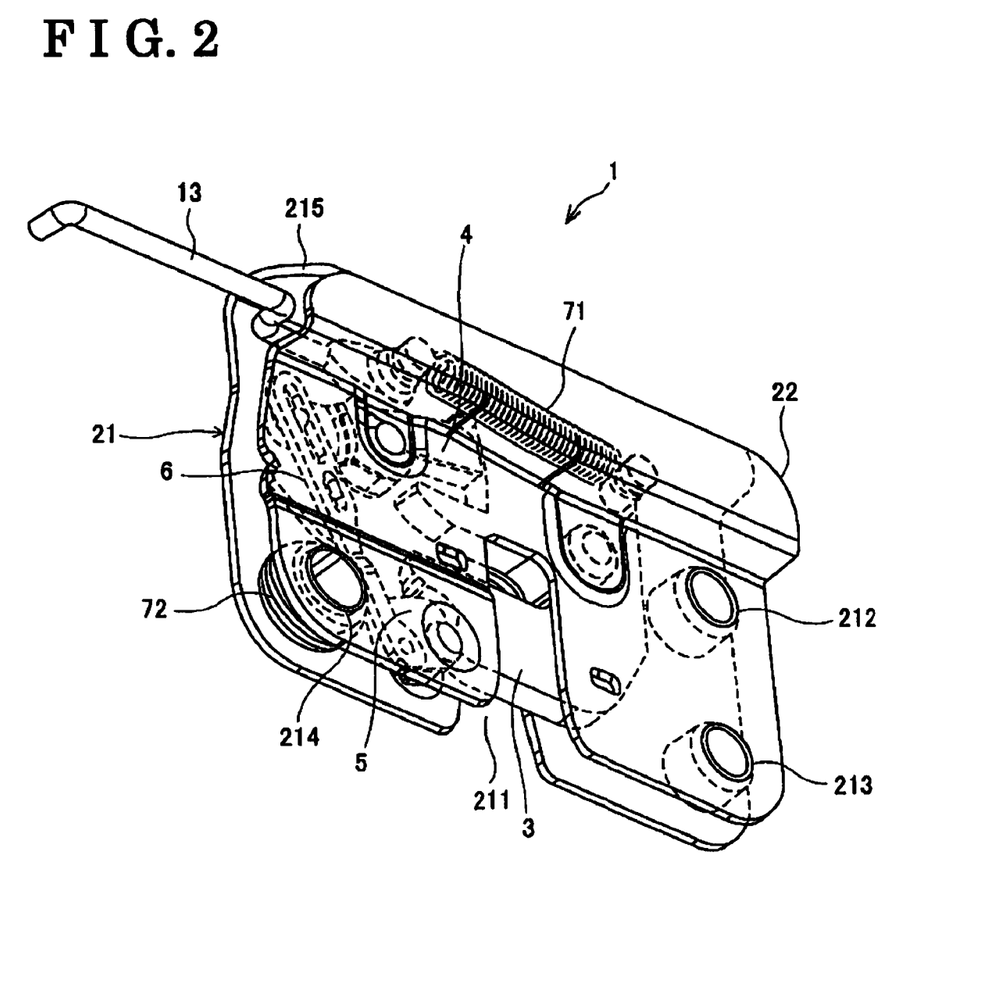
FIG. 2 is a perspective view illustrating the lock apparatus of the seat for the vehicle.

With reference to FIG. 2, a hook 3, a cam member 4 and a pawl 5 are accommodated between the base 21 and the sub base 22 and are rotatably supported thereto. Further, a link 6, a cam spring 71 (serving as a first biasing member) and a pawl spring 72 (serving as a second biasing member) are accommodated between the base 21 and the sub base 22.

Figure 3:
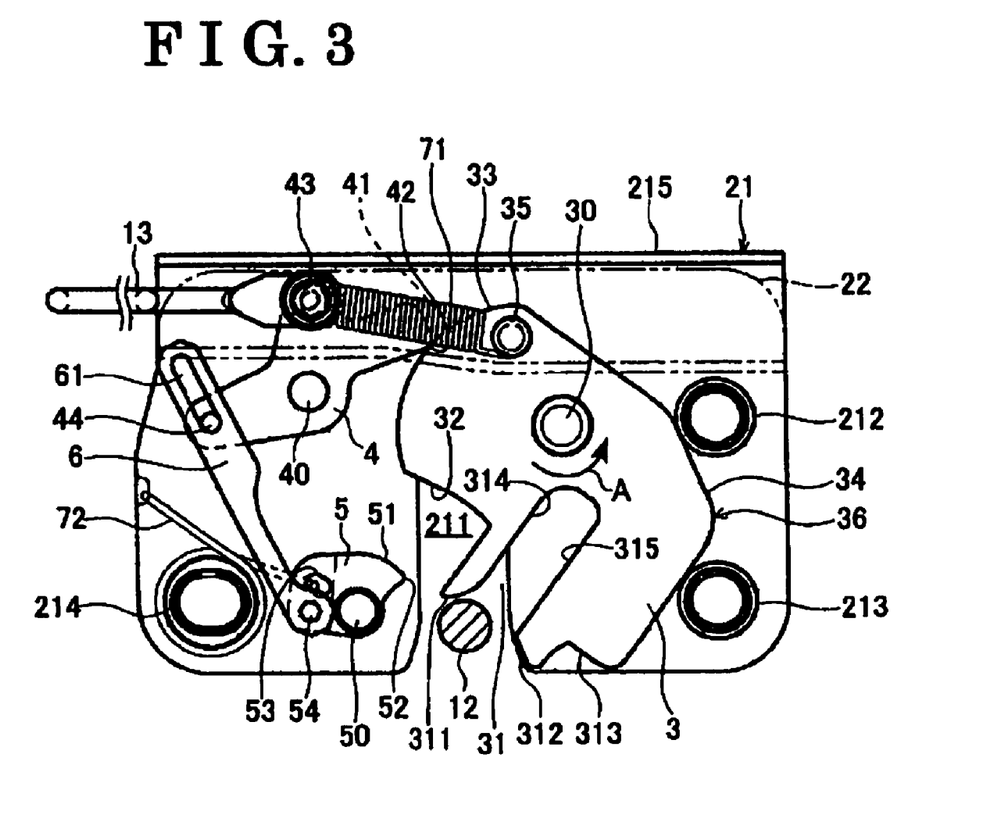
FIG. 3 is a planar view illustrating a structure of the lock apparatus in a released state.
Figure 4A:
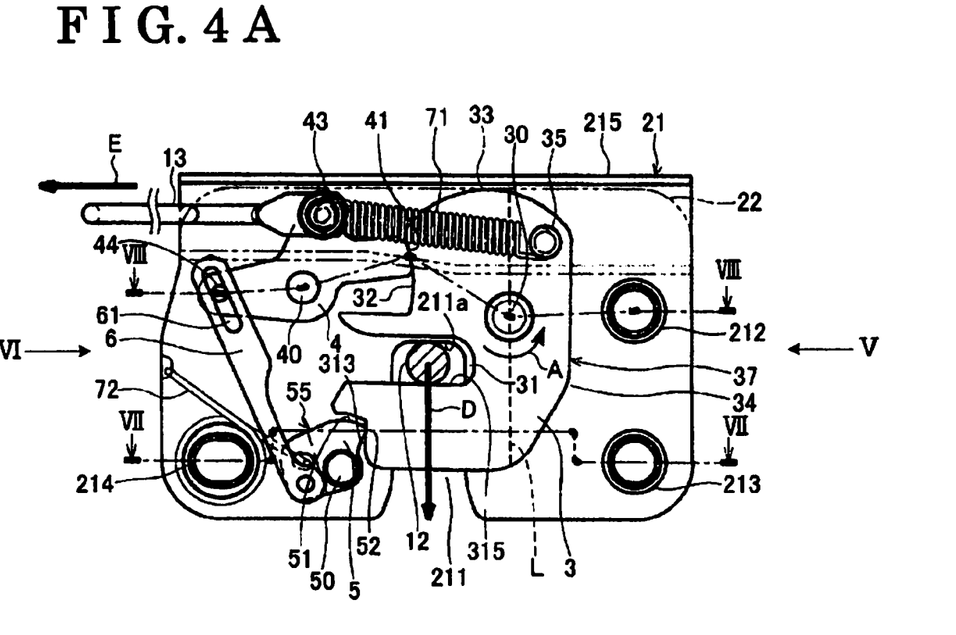
FIG. 4A is a planar view illustrating the structure of the lock apparatus in a locked state.
Figure 4B:
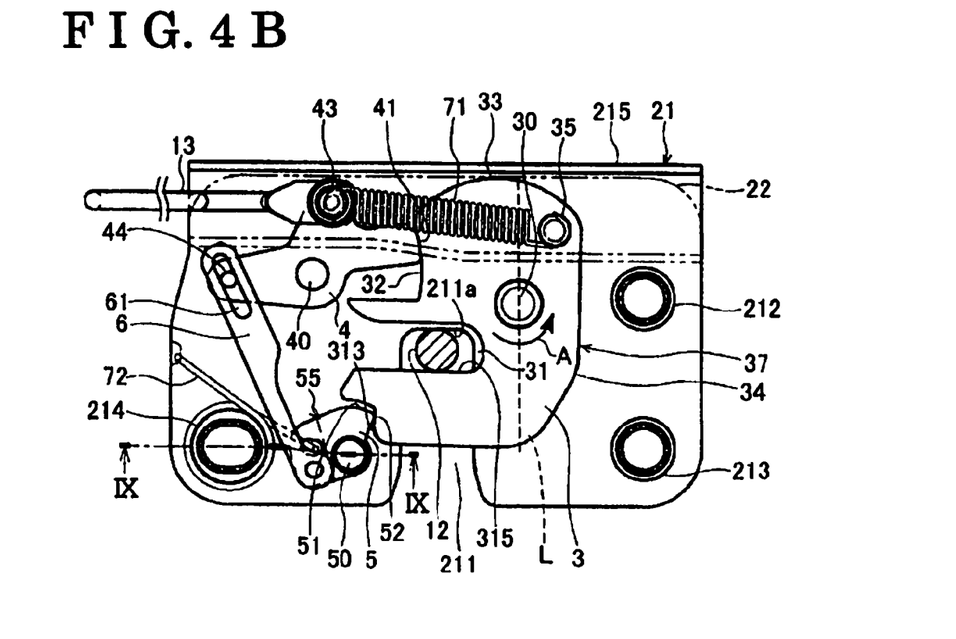
FIG. 4B is a planar view illustrating the structure of the lock apparatus in the locked state.
Figure 5:
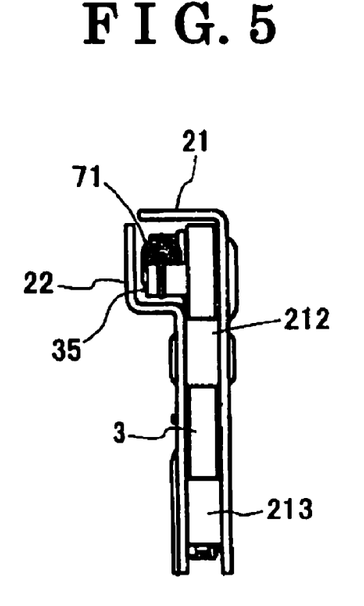
FIG. 5 is a side view illustrating the lock apparatus in the locked state seen from a direction indicated with an arrow V.
Figure 6:
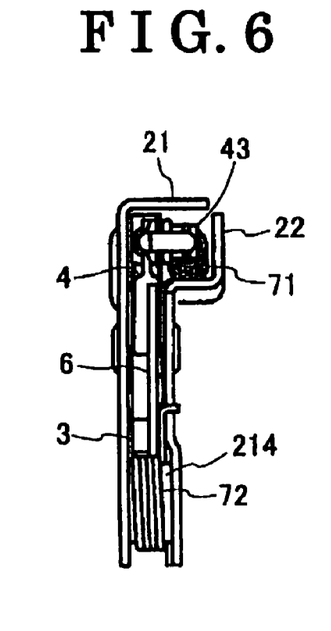
FIG. 6 is a side view illustrating the lock apparatus in the locked state seen from a direction indicated with an arrow VI.
Figure 7:
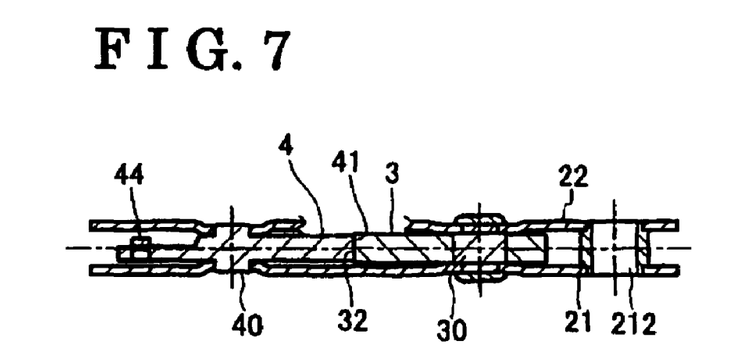
FIG. 7 is a cross sectional view illustrating the lock apparatus, taken along line VII-VII in FIG. 4A.
Figure 8:
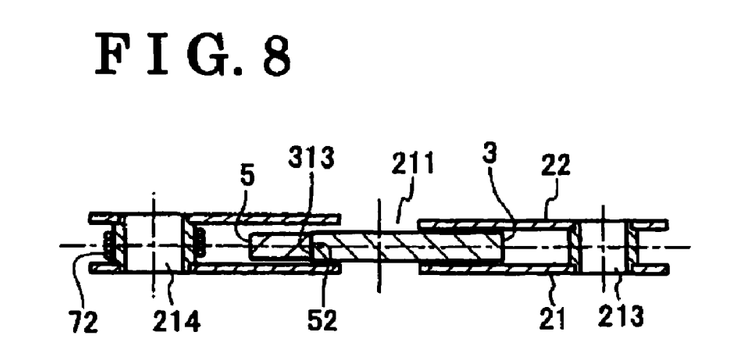
FIG. 8 is a cross sectional view illustrating the lock apparatus, taken along line VIII-VIII in FIG. 4A.
Figure 9:
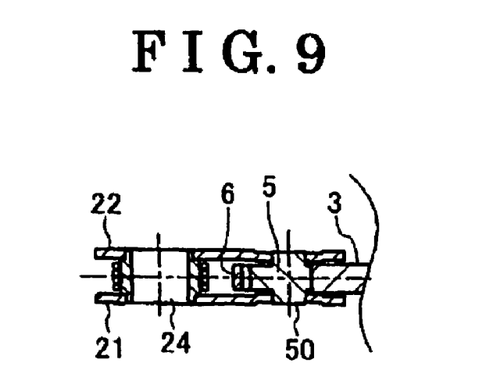
FIG. 9 is a cross sectional view illustrating the lock apparatus, taken along line IX-IX in FIG. 4B.

The base 21 is a plate member. A flange portion 215 is formed at a first side portion of the base 21 (i.e., an upper side portion in FIGS. 3, 4A and 4B) and is bent towards the sub base 22. Further, a base groove portion 211 (serving as a first groove portion) is formed at a second side portion of the base 21 (i.e., a lower side portion in FIGS. 3, 4A and 4B), which is an opposite side portion relative to the first side portion of the base 21. As is illustrated in FIGS. 3, 4A and 4B, the base groove portion 211 for inserting the striker (12) is grooved, or recessed, from an outer periphery of the second side portion of the base 21 towards a central portion of the base 21. The striker 12 is adapted to be engaged with the base groove portion 211. When the striker 12 is engaged in the base groove portion 211, the striker 12 makes contact with an inner end surface 211a (see FIG. 4) of the base groove portion 211. The locked state of the lock apparatus 1 according to the embodiment is illustrated in FIGS. 2, 4A and 4B. In FIG. 2, the striker 12 is not illustrated. The released state of the lock apparatus 1 is illustrated in FIG. 3. Further, in FIGS. 2 to 4B and 10 to 12, the sub base 22 is indicated by dotted lines. FIGS. 5 and 6 are side views of the lock apparatus 1 seen from arrows V and VI in FIG. 4, respectively, according to the embodiment. FIG. 7 is a cross sectional view of the lock apparatus 1 taken along line VII-VII in FIG. 4A. FIG. 8 is a cross sectional view of the lock apparatus 1 taken along line VIII-VIII in FIG. 4A. FIG. 9 is a cross sectional view of the lock apparatus 1 taken along line IX-IX in FIG. 4B.

Back to FIG. 2, an outer shape of the plate shaped sub base 22 is substantially the same as that of the base 21. Some portions of the sub base 22 are formed to protrude in a thickness direction thereof so as to correspond to positions of components assembled on the base 21. Spacers 212 and 213 are provided at a first side space between the base 21 and the sub base 22 relative to the base groove portion 211 (i.e., at a right side space in FIGS. 3 to 4B). A spacer 214 is provided at a second side space between the base 21 and the sub base 22 relative to the base grove portion 21 (i.e., at a left side space in FIGS. 3 to 4B). The sub base 22 is secured to the base 21 via the spacers 212, 213 and 214 (see FIGS. 5 and 6).

As illustrated in FIGS. 3, 4A and 4B, the hook 3 is a plate shaped member and is located adjacently to the spacers 212 and 213 (i.e., at the first side space between the base 21 and the sub base 22). A rotational shaft 30 is inserted at an approximately central position of the hook 3, thereby rotatably supporting the hook 3 to the base 21 and the sub base 22. A hook groove portion 31 (serving as a second groove portion) is formed at a first side surface portion (left side surface portion in FIGS. 4A and 4B) of the hook 3. More specifically, the hook groove portion 31 is grooved, or recessed, from an outer periphery of the first side surface portion of the hook 3 towards a central portion thereof. The striker 12 is inserted into and engaged with the hook groove portion 31 when the lock apparatus 1 is in the locked state. Further, an operational surface 32 (serving as an operational portion) is formed adjacent to the hook groove portion 31 (in FIGS. 4A and 4B, the operational surface 32 is formed at upper side of the hook groove portion 31). A cam contacting surface 33 is formed continuously from the operational surface 32 of the hook 3. A spacer contacting surface 34 is formed at a second side surface portion (a right side surface portion in FIGS. 4A and 4B) of the hook 3. With reference to FIGS. 4A and 4B, a first pin 35 is provided at an upper portion of one surface of the hook 3 (one surface adjacent to the sub base 22) so as to protrude in the thickness direction of the hook 3. One end of the cam spring 71 is locked to the first pin 35 of the hook 3. The hook 3 is pivoted (rotated) between an unlock position 36 and a lock position 37 about the rotational shaft 30. When the hook 3 is located at the unlock position 36 (see FIG. 3), the striker 12 is disengaged from the hook groove portion 31 of the hook 3 and the base groove portion 211 of the base 21. On the other hand, when the hook 3 is located at the lock position 37 (see FIGS. 4A and 4B), the striker 12 is inserted into and engaged with the hook groove portion 31 and the base groove potion 211 so as to prevent the striker from being disengaged from the hook groove portion 31. Herein, directions of the hook 3, such as "upper", "lower", "right" and "left" correspond to an orientation of FIGS. 4A and 4B, which illustrates the hook 3 located at the lock position 37. Further, the first and second side surface portions of the hook 3 respectively correspond to left and right side surfaces relative to a base line L which extends in an upper and lower direction of FIGS. 4A and 4B through the lock position 37.

A width length of the hook groove portion 31 is wide enough for inserting the striker 12. Further, a guiding surface portion 311 is formed at a front side surface 314 (upper side surface) of the hook groove portion 31 (see FIG. 3). When the striker 12 is inserted into the base groove portion 211 of the base 21, the striker 12 firstly makes contact with the guiding surface portion 311 of the hook groove portion 31. Further, a pawl pressing surface 312 and an engaging surface 313 (serving as an engagement portion) are formed continuously from the hook groove portion 31 of the hook 3 at a position being lower than a rear side surface 315 (lower side surface) of the hook groove portion 31 at the first side surface portion of the hook 3. The pawl pressing surface 312 presses an engagement corner portion 52 of the pawl 5, which will be described in detail later. The engaging surface 313 is engaged with the engagement corner portion 52 of the pawl 5. Herein, when the hook 3 is pivoted from the unlock position 36 towards the lock position 37 (in the clockwise direction), a side surface of the hook groove portion 31 in a front side in the pivotal movement of the hook 3 towards the lock position 37 (in the clockwise direction) is assigned to be the front side surface 314. In the same manner, a side surface of the hook groove portion 31 in a rear side in the pivotal movement of the hook 3 towards the lock position 37 (in the clockwise direction) is assigned to be the rear side surface 315.

The operational surface 32 is formed in a gradually curved shape (arc shape) which is slightly curved (recessed) towards an inner side of the hook 3 (i.e., towards the base line L). Further, the operational surface 32 is formed to be approximately perpendicular to the front and rear side surfaces 314 and 315 of the hook groove portion 31. The cam contacting surface 33 is substantially formed in an arc shape about the rotational shaft 30 at the upper surface portion of the hook 3. More specifically, the cam contacting surface 33 is formed in a manner so that the farther a distance from the operational surface 32 to an arbitrary point on the arc shape of the cam contacting surface 33 is, the smaller a distance from the rotational shaft 30 to the arbitrary point becomes. The spacer contacting surface 34 is formed at an opposite side (lower side) of the operational surface 32 and the cam contacting surface 33 relative to the rotational shaft 30.

With reference to FIG. 2, the cam member 4 is a plate member. The cam member 4 is provided at an upper side of the spacer 214 (i.e., at the second side space between the base 21 and the sub base 22) and is pivotably (rotatably) supported thereto by a rotational shaft 40. A cam surface 41 (serving as a cam profile) and a cam corner portion 42 are formed at a side surface of the cam member 4. Further, a second pin 43 and an engagement protrusion 44 are provided to protrude from a surface being adjacent to the sub base 22 in a thickness direction of the cam member 4. The cam surface 41 is formed at an opposite position of the engagement protrusion 44 relative to the rotational shaft 40, i.e., the rotational shaft 40 is located between the cam surface 41 and the engagement protrusion 44. The second pin 43 is located at an upper side of the rotational shaft 40.

The cam surface 41 (cam profile) of the cam member 4 is formed to be in cam contact with the operational surface 32 of the hook 3 for allowing a pivotal movement of the hook 3 towards the lock position 37 (in the clockwise direction) and to restrain a pivotal movement of the hook 3 towards the unlock position 36 (in the counterclockwise direction) when the hook 3 is pivoted towards the lock position 37 and when the hook 3 is located at the lock position 37, so that the striker 12 is surely inserted into and engaged with the base groove portion 211 and the hook groove portion 31 without backlash. Further, the cam surface 41 is formed in an arc shape of which a central point is slightly dislocated from the rotational shaft 40 towards the second pin 43. Therefore, the cam surface 41 is formed in a manner where a distance from the rotational shaft 40 to an arbitrary point on the arc shape of the cam surface 41 becomes larger as the arbitrary point is farther from the rotational shaft 40 in the counterclockwise direction. The cam corner portion 42 is located at one end portion of the cam surface 41 and is moved on an arced locus about the rotational shaft 40. More specifically, the cam corner portion 42 is located so that the arced locus of the cam corner portion 42 and the arc shaped portion of the cam contacting surface 33 are crossed. Thus, the cam corner portion 42 of the cam member 4 makes contact with the cam contacting surface 33 while the hook 3 is pivotally moved from the unlock position 36 towards the lock position 37 (in the clockwise direction) and from the lock position 37 towards the unlock position 36 (in the counterclockwise direction). A second end of the cam spring 71, of which first end is locked to the first pin 35 of the hook 3, is locked to the second pin 43. Thus, the cam spring 71 is provided between the first pin 35 of the hook 3 and the second pin 43 of the cam member 4. Therefore, tensile force acts to the hook 3 and the cam member 4 for biasing the hook 3 in the counterclockwise direction and for biasing the cam member 4 in the clockwise direction. The more the cam spring 71 extends in accordance with the pivotal movement of the hook 3 towards the lock position 37 (in the clockwise direction), the more the tensile force is increased. One end of the lever 13 for releasing the locked state of the lock apparatus 1 is engaged with the second pin 43 of the cam member 4. The engagement protrusion 44 is slidably inserted into and engaged with an oblong bore 61 formed at one end of the link 6, which will be described later.

The pawl 5 is located at the second side space between the base 21 and the sub base 22 (i.e., adjacently to the spacer 214) at a lower side of the cam member 4 and is pivotably (rotatably) supported thereto by the rotational shaft 50. An engagement corner portion 52 is formed at an end portion of the pawl 5 so as to be engaged with the engaging surface 313 of the hook 3. Further, an arc shaped surface 51, of which a central point is assigned to be the rotational shaft 50, is formed at an upper end surface of the pawl 5. When the hook 3 is located at the lock position 37 and the pawl 5 is located at an engaged position 55 (serving as a pawl engaged position) as illustrated in FIGS. 4A and 4B, the engagement corner portion 52 of the pawl 5 is in contact with (engaged with) the engaging surface 313 of the hook 3 so as to prevent the pivotal movement of the hook 3 towards the unlock position 36 (in the counterclockwise direction). In such condition, the arc shaped surface 51 faces a lower surface of the operational surface 32 while a slight space is provided therebetween. An engagement point between the engagement corner portion 52 of the pawl 5 and the engaging surface 313 of the hook 3 is defined to be further upwardly than a line connecting the rotational shaft 30 of the hook 3 and the rotational shaft 50 of the pawl 5. More specifically, when the hook 3 is pivoted to the lock position 37, the pawl 5 (the engagement corner portion 52) and the engaging surface 313 of the hook 3 are engaged in the pivotal movement of the hook 3 towards the lock position 37 at a rear position further than the rear side surface 315 of the rear side surface 315 of the hook groove portion 31. Therefore, the pivotal movement of the hook 3 towards the unlock position 36 is restrained.

As illustrated in FIGS. 3, 6 and 8, one end of the pawl spring 72 serving as a torsion spring wounded to the spacer 214 is locked to a locking portion 53 formed at the pawl 5. Another end of the pawl spring 72 is locked to a side surface of the sub base 21 at the vicinity of the spacer 214. The pawl 5 is biased in the clockwise direction by the pawl spring 72. A pin 54 is provided at a surface of the pawl 5 (a surface being adjacent to the sub base 22). The pin 54 protrudes from an opposite position of the engagement corner portion 52 relative to the rotational shaft 50 (i.e., the rotational shaft 50 is positioned between the engagement corner portion 52 and the pin 54). Another end of the link 6 (which will be described later) is pivotably connected to the pin 54 of the pawl 5.

As illustrated in FIGS. 7 and 9, the rotational shaft 40 is integrally formed at the cam member 4, and the rotational shaft 50 is integrally formed at the pawl 5. Herein, at least one of the cam member 4 and the pawl 5 may be integrally provided with the rotational shaft 40 and 50. Thus, the number of components of the lock apparatus 1 may be reduced. Further, such components may be assembled easily and accurately.

The link 6 for pivotally moving the pawl 5 is an elongated plate member. The oblong bore 61 (serving as a play portion) is formed at one end of the elongated link 6. The oblong bore 61 extends in a longitudinal direction of the link 6. The engagement protrusion 44 is engaged with the oblong bore 61 of the link 6. Another end of the link 6 is pivotably supported to the pin 54 provided at the pawl 5.

Next, an operation of the lock apparatus 1 according to the embodiment will be described hereinbelow. Firstly, the released state of the lock apparatus 1 will be described with reference to FIG. 3. When the lock apparatus 1 is in the released state, the hook 3 is located at the unlock position 36 and the cam corner portion 42 of the cam member 42 is in contact with the cam contacting surface 33 of the hook 3. As described above, the cam spring 71 is provided between the first pin 35 of the hook 3 and the second pin 43 of the cam member 4. Therefore, the tensile force is exerted between the hook 3 and the cam member 4. The hook 3 is biased to rotate (pivot) in the counterclockwise direction (a direction indicated by an arrow A) towards the unlock position 36 about the rotational shaft 30 while the cam member 4 is biased to rotate (pivot) in the clockwise direction about the rotational shaft 40. However, because the arc shape cam contacting surface 33 and the arced locus of the cam corner portion 42 are crossed, the cam corner portion 42 of the cam member 4 makes contact with the cam contacting surface 33 of the hook 3. Thus, the cam corner portion 42 presses the cam contacting surface 33 of the hook 3 to pivotally rotate in the counterclockwise direction. Accordingly, the hook 3 is pivoted in the counterclockwise direction until the spacer contacting surface 34 of the hook 3 makes contact with the spacer 212. The cam member 4 is not allowed to pivot further in the clockwise direction because the cam corner portion 42 of the cam member 4 is in contact with the cam contacting surface 33 of the hook 3. Accordingly, an opening of the hook groove portion 31 is located adjacently to an opening of the base groove portion 211, and the guiding surface portion 311 of the hook 3 is located at an intermediate portion of the base groove portion 211 in a width direction thereof, thus the hook 3 is located at the unlock position 36. Herein, the engagement protrusion 44 protruding from the cam member 4 is in contact with a lower end of the oblong bore 61 of the link 6, thus restraining a pivotal movement of the pawl 5 in the clockwise direction by the biasing force of the pawl spring 72 provided at the spacer 214.

Figure 10:
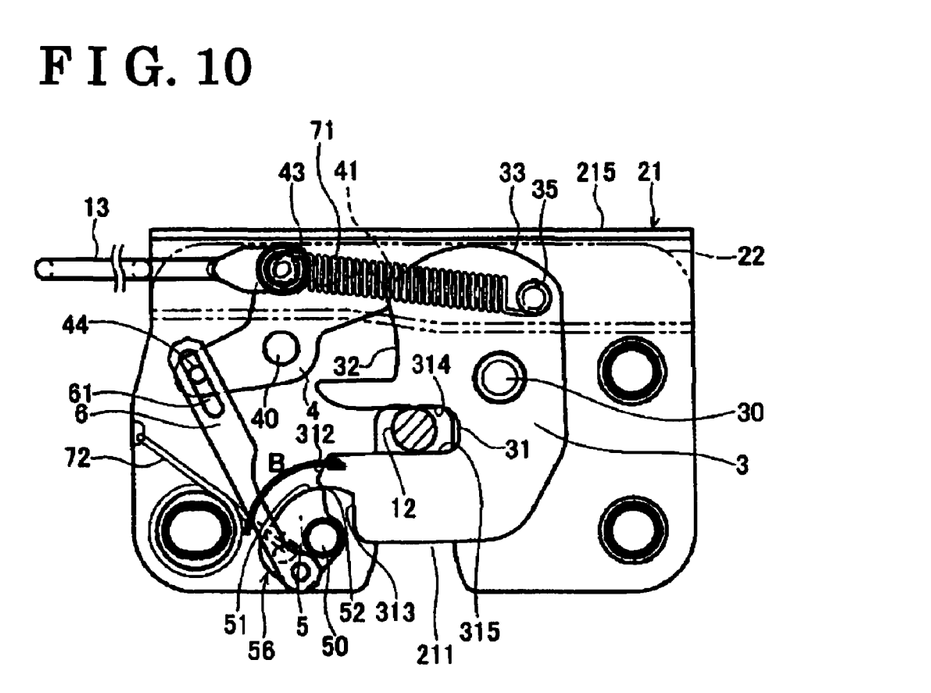
FIG. 10 is a planar view illustrating the structure of the lock apparatus in a condition before being shifted to the locked state.

Next, a manner where the lock apparatus 1 is shifted to the locked state from the released state will be described hereinafter with reference to FIGS. 3, 4A, 4B and 10. At first, as illustrated in FIG. 3, the striker 12 inserted into the base groove portion 211 from the opening thereof makes contact with the guiding surface portion 311 of the hook 3 located at the unlock position 36 and presses the hook 3. Then, the striker 12 progresses towards the inner side of the base groove portion 211. The striker 12 successively presses the base groove portion 31 from the guiding surface portion 311 to the front side surface 314, thus pivoting the hook 3 towards the lock position 37, i.e., in the clockwise direction. At this time, the cam corner portion 42 of the cam member 4 slides through the cam contacting surface 33 of the hook 3 pivoting towards the lock position 37. Therefore, the cam spring 71 extends and thereby amplitude of the tensile force of the cam spring 71 is increased. When the hook 3 is pivoted towards the lock position 37 by a certain degree, the pawl pressing surface 312 of the hook 3 makes contact with the engagement corner portion 52 of the pawl 5. Then, as illustrated in FIG. 10, the pivotal movement of the hook 3 towards the lock position 37 allows the pawl 5 to pivot in the counterclockwise direction against the biasing force of the pawl spring 72, which biases the pawl 5 to be positioned at the engaged position 55 in the clockwise direction (i.e., in a direction indicated with an arrow B). Thus, the corner portion 52 of the pawl 5 is disengaged from the pawl pressing surface 312 of the hook 3, and the pawl pressing surface 312 of the hook 3 passes through the engagement corner portion 52 of the pawl 5. Because of the pivotal movement of the pawl 5 in the counterclockwise direction, the link 6 is moved downwardly and the engagement protrusion 44 of the cam member 4 moves upwardly in the oblong bore 61 of the cam member 6. Therefore, the cam member 4 is not pivoted. Then, when the hook 3 is pivoted further towards the lock position 37, the cam corner portion 42 of the cam member 4 moves from the cam contacting surface 33 to the operational surface 32 of the hook 3. In such a state, when the striker 12 inserted into the base groove portion 211 presses the front side surface 314 of the hook groove portion 31 of the hook 3, the striker 12 makes contact with the inner end surface 211a of the base groove portion 211. When the striker 12 makes contact with the inner end surface 211a of the base groove portion 211, the striker 12 is not allowed to press the hook 3 towards the lock position 37 (i.e., in the clockwise direction). However, when the cam surface 41 of the cam member 4 makes contact with the operational surface 32 of the hook 3, the cam member 4 is pivoted in the clockwise direction by the biasing force of the cam spring 71 in accordance with the pivotal movement of the hook 3. The cam surface 41 of the cam member 4 is formed in manner where the length from the rotational shaft 40 becomes larger in the counterclockwise direction. Therefore, when the cam member 4 is pivoted in the clockwise direction, the cam surface 41 keeps making contact with the operational surface 32 of the hook 3 following the rotation of the cam member 4 because of the larger length of the cam surface 41. Accordingly, the striker 12 is positioned in a space defined by the rear side surface 315 of the hook groove portion 31 and the inner end surface 211a of the base groove portion 211, thus restraining the hook 3 from being pivoted towards the unlock position 36 by the cam member 4.

When the hook 3 is pivoted towards the lock position 37, the pawl 5 is pivoted in the counterclockwise direction by the pawl pressing surface 312. Then, the engagement corner portion 52 of the pawl 5 moves away from the pawl pressing surface 312 and is then engaged with the engaging surface 313. At this time, the arc shaped surface 51 of the pawl 5 faces the lower end surface of the hook 3 at a position being slightly away from the lower end surface of the hook 3. The link 6 is moved upwardly because of the pivotal movement of the pawl 5 in the clockwise direction. However, because the engagement protrusion 44 of the cam member 4 slides in the oblong bore 61 of the link 6, the movement of the cam member 4 and the pivotal movement of the pawl 5 are not associated with each other.

When the lock apparatus 1 is in the locked state as illustrated in FIG. 4A and in a case where external force is applied from the striker 12 towards the opening of the base groove portion 211 (in a direction indicated with an arrow D in FIG. 4A), the hook 3 receives a force towards the unlock position 36. However, because the operational surface 32 of the hook 3 is engaged with the cam surface 41 of the cam member 4, the locked state of the lock apparatus 1 may not be readily released with small force. In a case where a large force is applied to the hook 3 to pivot the hook 3 towards the unlock position 36 (in the counterclockwise direction), or in a case where a form of the cam member 4 is changed to pivot the hook towards the unlock position 36, the pawl 5 prevents the hook 3 from being pivoted towards the unlock position 36. In other words, the engagement point between the engagement corner portion 52 and the engaging surface 313 is defined to be further upwardly than a line connecting the rotational shaft 30 of the hook 3 and the rotational shaft 50 of the pawl 5, and the engagement corner portion 52 and the engaging surface 313 are engaged in the pivotal movement of the hook 3 towards the lock position 37 at the rear position further than the rear side surface 315 of the hook groove portion 31. Therefore, the pivotal movement of the hook 3 in the counterclockwise direction (towards the unlock position 36) is restrained. At this time, the rotational shaft 30 of the hook 3 is located at an opposite position of the rotational shaft 50 of the pawl 5 relative to the striker 12, i.e., the striker 12 is located between the rotational shaft 30 and the rotational shaft 50. Further, an operational point of the external force exerted from the striker 12 to the hook 3 is located between the rotational shaft 30 of the hook 3 and the engagement point between the engagement corner portion 52 and the engaging surface 313. Therefore, the hook 3 is supported by two points (at the rotational shaft 30 of the hook 3 and the position where the pawl 5 and the engagement portion 313 of the hook 3 are engaged) relative to the external force indicated by the arrow D, so that the strength of the hook 3 is enough to resist the external force.

Figure 11:
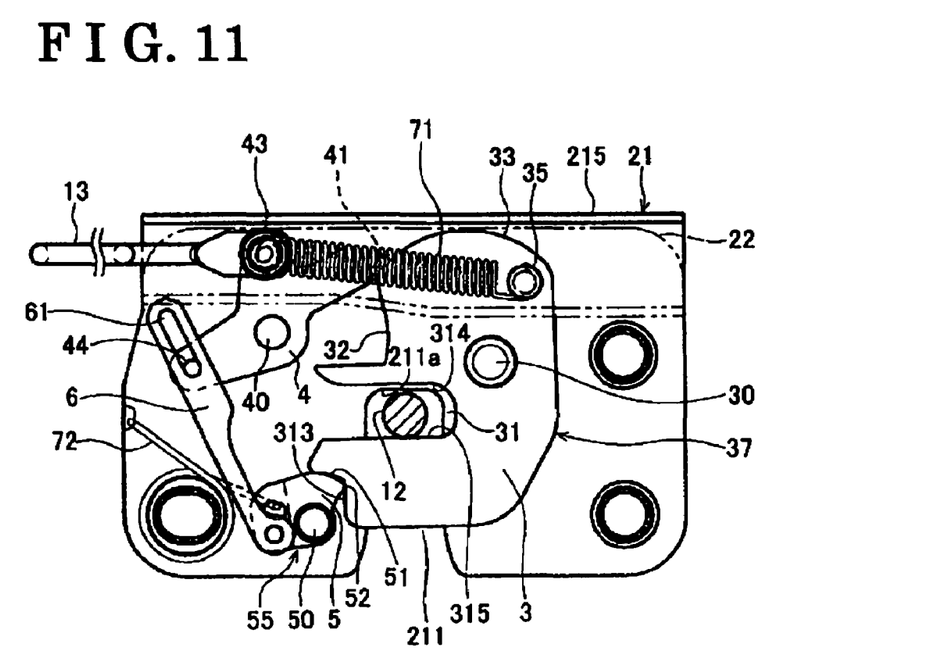
FIG. 11 is a planar view illustrating the structure of the lock apparatus in a condition to be released from the locked state.

Next, a manner where the lock apparatus 1 is shifted to the released state from the locked state will be described hereinafter with reference to FIGS. 3, 4A, 4B, 11 and 12. At first, as illustrated in FIGS. 4A and 4B, the inner end surface 211a of the base groove portion 211 and the rear side surface 315 of the hook groove portion 31 surround the striker 12, thus the lock apparatus 1 is in the locked state. In such condition, the lever 13 is pulled in a direction indicated with an arrow E as illustrated in FIG. 4A. Because one end of the lever 13 is pivotally supported by the second pin 43 of the cam member 4, the cam member 4 is pivoted in the counterclockwise direction about the rotational shaft 40. Then, the cam surface 41 of the cam member 4, which presses the operational surface 32 of the hook 3, slides along the operational surface 32 towards the cam contacting surface 33 and then moves away from the operational surface 32. As illustrated in FIG. 11, the operational surface 32 of the hook 3 is not pressed by the cam surface 41 of the cam member 4 and the hook 3 tends to pivot in the counterclockwise direction (towards the unlock position 36), however, the hook 3 is restrained from pivoting by a contact of the arc shape 51 of the pawl 5 with the operational surface 32 of the hook 3.

Figure 12:
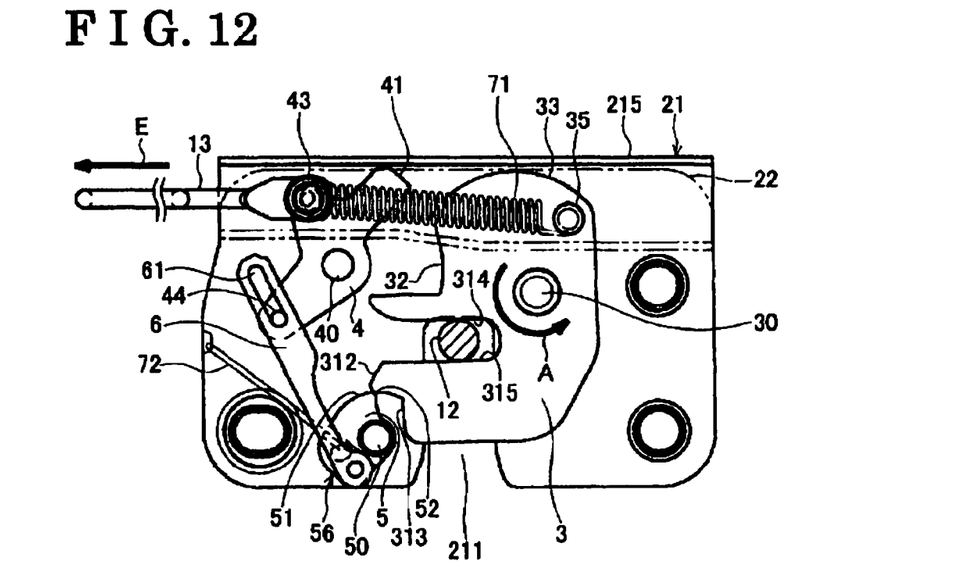
FIG. 12 is a planar view illustrating the structure of the lock apparatus in a condition before being shifted to the released state.

When the lever 13 is further pulled in the direction indicated with the arrow E, the cam surface 41 is completely separated from the operational surface 32 of the hook 3. Then, as best shown in FIG. 12, the engagement protrusion 44, which is located at an opposite position of the cam surface 41, makes contact with the end portion (lower end portion in the drawings) of the oblong bore 61 of the link 6, thus pivoting the pawl 5 to a released position 56 (serving as a pawl released position) in the counterclockwise direction. Thus, the link member 6 moves the pawl 5 to the released position 56 at which the pawl 5 is released from the hook 3 against the biasing force of the pawl spring 72 in association with the pivotal movement of the cam member 4 in the direction at which the cam surface 41 separates from the operational surface 32 of the hook 3. Still further, because the oblong bore 61 of the link 6 allows a pivotal movement of the pawl 5 relative to the pivotal movement of the cam member 4 by a predetermined angle, a timing for pivotally moving the cam member 4 and a timing for pivotally moving the pawl 5 are differentiated. Therefore, the pawl 5 is prevented from engaging with a lower surface of the hook 3 when releasing the pawl 5. Then, the pawl 5, which is disengaged from the engaging surface 313 of the hook 3 and pivoted to the released position 56, allows the pivotal movement of the hook 3 towards the unlock position 36. Further, as illustrated in FIG. 3, the striker 12 is released from the space defined by the hook groove portion 31 and the base groove portion 211, and the hook 3 is pivoted in the counterclockwise direction towards the unlock position 36.

According to the lock apparatus 1 of the embodiment described above, even when the external force is applied from the striker 12 to the hook 3 so as to release the striker 12 away from the space defined by the rear side surface 315 of the hook groove portion 31 and the inner end surface 211a of the base groove portion 211 and therefore the pivotal movement of the hook 3 in the counterclockwise direction may not be restrained by the cam member 4 when the lock apparatus 1 is in the locked state, the pawl 5 restrains pivotal movement of the hook 3 towards the unlock position 36. At this time, the rotational shaft 30 of the hook 3 is located at the opposite position of the rotational shaft 50 of the pawl 5 relative to the striker 12, i.e., the striker 12 engaged with the base groove portion 211 and the hook groove portion 31 is positioned between the rotational shaft 30 and the rotational shaft 50. Further, the pawl 5 and the engaging surface 313 of the hook 3 is engaged at an opposite side of the rotational shaft 30 of the hook 3 relative to the striker 12 so as to support the hook 3 relative to the striker 12 at the rotational shaft 30 of the hook 3 and at the position where the pawl 5 and the engagement portion 313 of the hook 3 are engaged. Thus, because the operational point where the external force is exerted to the hook 3 from the striker 12 is positioned between the rotational shaft 30 of the hook 3 and the engagement point between the engagement portion 52 of the pawl 5 and the engaging surface 313 of the hook 3, the hook 3 is supported at two points relative to the external force D. Accordingly, the strength of the hook 3 is large enough to resist the external force in comparison with a case where the hook 3 is supported only at one side relative to the external force D. In addition, due to the above described structure, a form of the hook 3 may be downsized. Further, thickness and/or weight of each component may be reduced. Still further, the shorter a length between the rotational shaft 50 of the pawl 5 and the engagement corner portion 52 for contacting (engaging) the engaging surface 313 of the hook 3 is, the greater the strength of the lock apparatus 1 is. On the other hand, the larger a length between the rotational shaft 40 of the cam member 4 and the cam surface 41 for contacting (engaging) the operational surface 32 of the hook 3 is, the greater the efficiency for restraining the backlash is. According to the above described embodiment, the rotational shaft 40 of the cam member 4 and the rotational shaft 50 of the pawl 5 are located separately from each other. Therefore, the length between the rotational shaft 50 and the engagement corner portion 52 of the pawl 50 is arranged to be short, thus increasing the strength of the lock apparatus 1 for resisting the external force, for example. On the other hand, the length between the rotational shaft 40a and the cam surface 41 of the cam member 4 is arranged to be large, thus efficiently engaging the operational surface 32 of the hook 3 with the cam surface 41.

Then, the operational surface 32 of the hook 3 is pressed by the cam surface 41 of the cam member 4 by means of the cam spring 71 when the hook 3 is located at the lock position 37. Accordingly, the striker 12 is engaged with the hook groove portion 31 and the base groove portion 211 without backlash by being positioned in the space defined by the rear side surface 315 of the hook groove portion 31 and the inner end surface 211a of the base groove portion 211. Further, when the lock apparatus 1 is in the released state where the striker 12 is not engaged with the base groove portion 211 and the hook groove portion 31, the hook 3 is biased to pivot towards the unlock position 36 by means of the cam spring 71. Therefore, when the striker 12 is inserted into and engaged with the base groove portion 211 from an opening thereof towards the inner end surface 211a, the hook 3 is retained until the striker 12 is moved towards the inner end surface 211a and contacts the guiding surface portion 311. In other words, because the hook 3 is retained at the unlock position 36 when the lock apparatus 1 is in the released state, the hook 3 is prevented from contacting (impacting) other components thereby preventing backlash noise from being generated.

Then, the pawl 5 is biased by the pawl spring 72 so as to be positioned at the engaged position 55 and the engagement corner portion 52 of the pawl 5 is engaged with the engaging surface 313 of the hook 3. Therefore, the hook 3 is prevented from being pivoted towards the unlock position 36 from the lock position 37. Further, when the hook 3 is pivoted from the lock position 37 towards the unlock position 36, the cam member 4 and the pawl 5 are moved in association with each other by means of the link 6, and the pawl 5 is pivoted to a released position 56. Therefore, the hook 3 is smoothly pivoted towards the unlock position 36. Then, because of the oblong bore 61 formed at the link 6, a timing of the pivotal movement of the cam member 4 and the pivotal movement of the pawl 5, which are associated with each other, is differentiated. Therefore, when the hook 3 is pivoted towards the lock position 37, or towards the unlock position 36, the pawl 5 is prevented from being engaged with the hook 3, thus surely performing a lock operation and a lock-release operation of the lock apparatus 1.

Further, because the rotational shaft 40 of the cam member 4 and the rotational shaft 50 of the pawl 5 are separately arranged from each other, the cam member 4 and the pawl 5 are arranged so as not to overlap each other in a thickness direction thereof. With such arrangement, centers of the cam member 4, the hook 3 and the pawl 5 in the thickness direction thereof are arranged to be coplanar. In other words, the center of the hook 3 in the thickness direction is pressed by the cam surface 41 of the cam member 4. In addition, the center of the engaging surface 313 of the hook 3 in the thickness direction is pressed by the arc shaped surface 51 of the pawl 5. Therefore, the torsion moment is prevented from being generated at the rotational shaft 30 of the hook 3.

Figure 13:
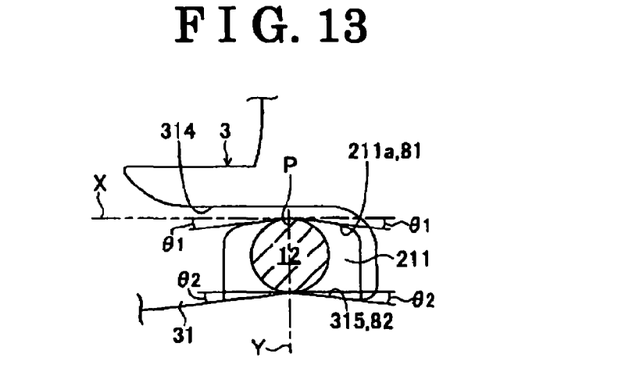
FIG. 13 is an enlarged view illustrating a part of the lock apparatus in the locked state, according to a modified embodiment.
Figure 14:
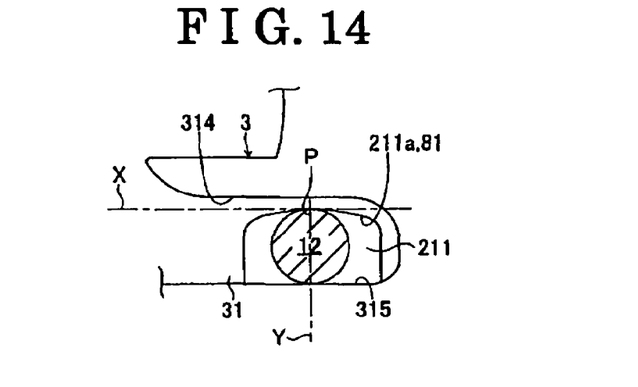
FIG. 14 is an enlarged view illustrating the part of the lock apparatus in the locked state, according to the modified embodiment.
Figure 15A:
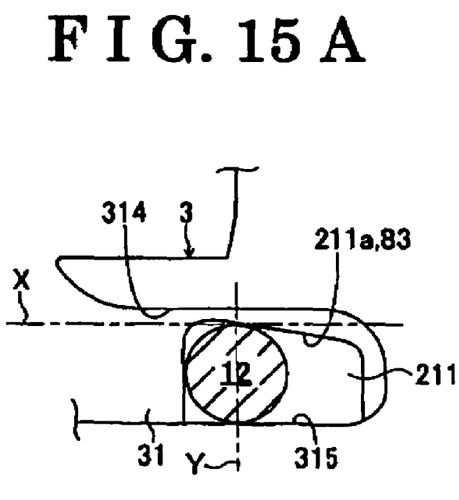
FIG. 15A is an enlarged view illustrating the part of the lock apparatus in the locked state, according to the modified embodiment.
Figure 15B:
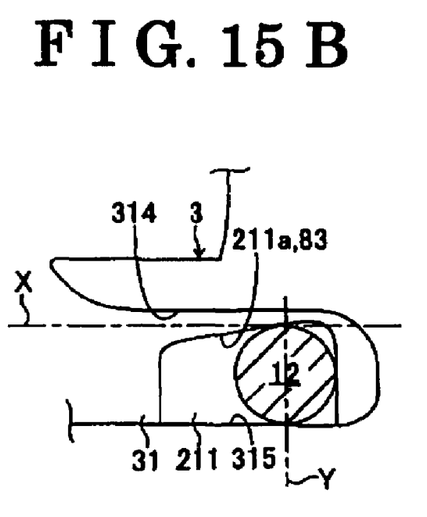
FIG. 15B is an enlarged view illustrating the part of the lock apparatus in the locked state, according to the modified embodiment.

A modified embodiment will be described hereinafter with reference to FIGS. 13 to 15B. According to the modified embodiment, the inner end surface 211a of the base groove portion 211 and/or the rear side surface 315 of the hook groove portion 31 are formed in an inclined manner. FIGS. 13 to 15 illustrate a condition where the striker 12 is engaged between the base groove portion 211 and the hook groove portion 31 and is surrounded by the inner end surface 211a of the base groove portion 31 and the rear side surface 315 of the hook groove portion 31.

As illustrated in FIG. 13, the inner end surface 211a of the base groove portion 211 includes an inclined surface 81, which is formed at both sides of a cross position (stabilized portion P) between the inner end surface 211a of the base groove portion 21 and a path for inserting the striker 12 in the base groove portion 21. The inclined surface 81 (serving as a first inclined surface) is formed inclining from the stabilized position P towards the opening of the base groove portion 211 relative to a direction X which is perpendicular to a direction Y which is a moving direction of the striker 12 (the path for inserting the striker 12). The inclined surface 81 is recessed towards the stabilized portion P. An inclined angle θ1 of the inclined surface 81 is defined so as to be equal to or larger than a frictional angle between the striker 12 and the inclined surface 81 of the inner end surface 211a of the base groove portion 211.

An inclined surface 82 (serving as a second inclined surface) is formed at the rear side surface 315 of the hook groove portion 31 of the hook 3 so as to face the inclined surface 81 of the inner end surface 211a of the base groove portion 211. More specifically, the inclined surface 82 is formed inclining towards the opening of the base groove portion 211 when the hook 3 is positioned at the lock position 37 relative to the direction X by an inclined angle θ2. The inclined angle θ2 of the inclined surface 82 is defined to be lower than the inclined angle θ1 of the inclined surface 81 of the base groove portion 211.

Thus, because the inclined angle θ2 of the inclined surface 82 of the hook groove portion 31 is defined to be smaller than the inclined angle θ1 of the inclined surface 81 of the base groove portion 211, the further the distance from the striker 12 is, the narrower a space between the inclined surface 81 of the base groove portion 211 and the inclined surface 82 of the hook groove portion 31 becomes, when the striker 12 is engaged with the base groove portion 211 and the hook groove portion 31. Therefore, even when the striker 12 vibrates due to the external force, for example, the striker 12 is restrained from moving from the stabilized position P in the direction X along the inclined surface 81 of the inner end surface 211a of the base groove portion 211. Thus, the cam member 4 is surely prevented from pivoting and engaging with the operational surface 32 of the hook 3. Further, even when the striker 12 vibrates due to the external force in a case where the striker 12 is dislocated from the stabilized position P when the lock apparatus 1 is locked, for example, the movement of the striker 12 in the direction where the space between the inclined surfaces 81 and 82 becomes narrower is restrained while the movement of the striker 12 in a direction where the space between the inclined surfaces 81 and 82 becomes larger is allowed. In other words, the striker 12 is guided to the stabilized position P. Then, the striker 12 is restrained from moving from the stabilized position P in the direction X along the inclined surface 81 of the base groove portion 211.

Accordingly, the cam member 4 is prevented from pivoting to move the hook 3 towards the lock position 37 thereby prevented from engaging with the operational surface 32 of the hook 3 in accordance with the movement of the striker 12 towards the direction where the space between the inclined surfaces 81 and 82 becomes larger in the space defined by the inner end surface 211a of the base groove portion 211 and the rear side surface 315 of the hook groove portion 31 because of the vibration due to the external force. Thus, an operational force for pivoting the cam surface 41 of the cam member 4 to pivot in a direction to be away from the operational surface 32 of the hook 3 is prevented from being increased.

Further, the inclined angle θ1 of the inclined surface 81 of the base groove portion 211 is arranged to be larger than the frictional angle (more specifically, a dynamic frictional angle) between the striker 12 and the inclined surface 81. Therefore, even when the striker 12 is moved in the direction where the space between the inclined surfaces 81 and 82 becomes smaller (narrower) at the space defined by the inner end surface 211a of the base groove portion 211 and the rear side surface 315 of the hook groove portion 31 because of the external force, for example, the striker 12 is readily returned to the stabilized position P, which is a position where the striker 12 is located before being moved by the external force. Accordingly, the cam member 4 is efficiently restrained from pivoting and engaging with the operational surface 32 of the hook 3 to move the hook 3 towards the lock position 37. Therefore, the operational force for pivoting the cam member 4 in a direction to be separated from the operational surface 32 of the hook 3 is effectively restrained from being increased.

As described above, when being in the locked state of the lock apparatus 1 (when the striker 12 is positioned in the base groove portion 211 and the hook groove portion 31), the further the distance from the striker 12 is, the narrower the space between the inclined surfaces 81 and 82 of the base groove portion 211 and the hook groove portion 31 becomes. Therefore, the striker 12 is geometrically restrained from moving from the stabilized position P in the direction X along the inclined surface 81 of the base groove portion 211. In addition, even when the striker 12 is moved to be away from the stabilized position P relative to the base 21 in accordance with elastic deformation and/or looseness caused on the basis of vibration of the vehicle and/or the external force, for example, the striker 12 is readily returned to the stabilized position P by the pressing force received from the rear side surface 315 of the hook groove portion 31 because the inclined angle θ1 of the inclined surface 81 of the base groove portion 211 is defined to be larger than the dynamic frictional angle between the striker 12 and the inclined surface of the base groove portion 21 and further because the striker 12 and the base 21 are relatively vibrated. Additionally, in a case where the inclined angle θ1 of the inclined surface 81 of the base groove portion 211 is defined to be larger than a static frictional angle between the striker 12 and the inclined surface 81 of the base groove portion 21, the striker 12 is pressed by the rear side surface 315 of the hook groove portion 31 and thereby returns to the stabilized position P more easily.

Further, because the inclined surface 82 is formed at the rear side surface 315 of the hook 3 so as to face the inclined surface 81 of the inner end surface 211a of the base groove portion 211 at the locked state of the lock apparatus 1, even in a case where a contacting position between the rear side surface 315 and the striker 12 deviates due to dimensional inaccuracy when the lock apparatus 1 is in the locked state, differences of a position where the pivotal movement of the hook 3 towards the lock position 37 is restrained may be reduced. Therefore, the hook 3 is prevented from stopping at a position where the cam surface 41 of the cam member 4 and the operational surface 32 of the hook 3 may not sufficiently contact each other, and the cam member 4 and the hook 3 are prevented from being loosely engaged with each other.

Still further, as illustrated in FIG. 14, only the inclined surface 81 of the base groove portion 211 may be provided at the inner end surface (211a) of the base groove portion inclining from the stabilized position P towards the opening of the base groove portion 211 relative to the direction X. The inclined surface 81 may be formed at both sides of the stabilized position P at the inner end surface 211a of the base groove portion 211.

So configured, a space between the inclined surface 81 of the inner end surface 211a of the base groove portion 211 and the rear side surface 315 of the hook groove portion 31 becomes narrower at a position being away from the striker 12. Therefore, even when the striker 12 vibrates due to the external force, for example, the striker 12 is restrained from moving in the direction X along the inclined surface 81 of the base groove portion 211, i.e., the striker 12 is restrained from moving in a direction where the space between the inclined surface 81 and the rear side surface 315 becomes narrower from the stabilized position P. Accordingly, the cam member 4 is restrained from pivoting and engaging with the operational surface 32 of the hook 3 in accordance with the movement of the striker 12 towards the direction where the space between the inclined surface 81 and the rear side surface 315 becomes larger, thereby restraining the operational force for pivoting the cam surface 41 in a direction to be away from the operational surface 32 of the hook 3 from being increased.

As illustrated in FIGS. 15A and 15B, the inclined surface 81 formed at the inner end surface 211a is modified as an inclined surface 83 (serving as the first inclined portion), which inclines from one end portion of the inner end surface 211a towards another end portion thereof relative to the direction X. FIG. 15A illustrates the inclined surface 83 which is formed so that the space between the inner end surface 211a and the rear side surface 315 becomes larger towards the opening of the hook groove portion 31 (towards the left side in the drawing). On the other hand, FIG. 15B illustrates the inclined surface 83 which is formed so that the space between the inner end surface 211a and the rear side surface 315 becomes larger towards an inner end surface of the hook groove portion 31 (towards the right side in the drawing). Additionally, when the lock apparatus 1 is in the locked state where the striker 12 is surrounded by the inner end surface 211a of the base groove portion 211 and the rear side surface 315 of the hook groove portion 31, the striker 12 may be located at a position where the space between the inner end surface 211a and the rear side surface 315 is the largest and may make contact with one side surface of the base groove portion 211 (i.e., left side surface in FIG. 15A and right side surface in FIG. 15B) so as to stabilize the locked state of the lock apparatus 1.

So configured, a space between the inclined surface 83 of the inner end surface 211a of the base groove portion 211 and the rear side surface 315 of the hook groove portion 31 becomes narrower at positions being away from the striker 12. Therefore, even when the striker 12 vibrates due to the external force, for example, the striker 12 is restrained from moving in the direction X along the inclined surface 83 of the base groove portion 211. Accordingly, the cam member 4 is restrained from engaging with the operational surface 32 of the hook 3, thereby restraining the operational force for pivoting the cam surface 41 in a direction to be away from the operational surface 32 of the hook 3 from being increased.

According to the modified embodiment illustrated in FIGS. 13 to 15B, the inclined angle θ1 of the inclined surface 81, 83 may be arranged to be smaller than the frictional angle. In a case where the inclined angle θ1 is arranged so that the space between the inclined surface 81, 83 of the base groove portion 211 and the rear side surface 315 of the hook groove portion 31 becomes narrower at positions being away from the striker 12, the striker 12 is further restrained from being moved as long as the inner end surface 211a of the base groove portion 211 is formed in the inclined manner in comparison with a case where the inner end surface 211a of the base groove portion 211 is not formed in the inclined manner. Thus, the cam member 4 is restrained from being engaged with the operational surface 32 of the hook 3.

The present invention is not limited to the embodiments described above. For example, the rotational shaft 40 of the cam member 4 may be arranged at the same position of the rotational shaft 50 of the pawl 5, or adjacently to the position of the rotational shaft 50.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A lock apparatus of a seat for a vehicle, comprising:
   a striker adapted to be securely provided at one of a movable member of the seat and a fixed member fixedly provided relative to the movable member;
   a base adapted to be provided at the other of the movable member and the fixed member and including a first groove portion for inserting the striker;
   a hook including a second groove portion, the hook rotatably supported to the base about a first rotational shaft to pivot between a lock position at which the striker is engaged with the first groove portion and the second groove portion and an unlock position at which the striker is released from the first groove portion and the second groove portion;
   a pawl rotatably supported to the base about a second rotational shaft to engage with and disengage from an engagement portion of the hook, the pawl restraining a pivotal movement of the hook towards the unlock position while allowing the pivotal movement of the hook towards the lock position by being engaged with the engagement portion of the hook;
   a cam member rotatably supported to the base about a third rotational shaft and including a cam profile to be in cam contact with an operational portion formed at the hook for allowing the pivotal movement of the hook towards the lock position and for restraining the pivotal movement of the hook towards the unlock position; and
   a first biasing member for biasing the cam member to pivot in a direction in which the cam profile presses the operational portion of the hook;
   a second biasing member for biasing the pawl to be positioned at a pawl engaged position at which the pawl is engaged with the hook; and
   a link member for pivotally moving the pawl to a pawl released position at which the pawl is released from the hook against a biasing force of the second biasing member in association with a pivotal movement of the cam member in a direction in which the cam profile separates from the operational portion of the hook, the link member including a play portion for allowing a pivotal movement of the pawl relative to a pivotal movement of the cam member by a predetermined angle,
   wherein, when the hook is pivoted to the lock position, the striker is engaged with the first groove portion and the second groove portion is positioned between the first rotational shaft of the hook and the second rotational shaft of the pawl, and the pawl and the engagement portion of the hook are engaged at an opposite position of the first rotational shaft of the hook relative to the striker for supporting the hook relative to the striker at the first rotational shaft of the hook and at a position at which the pawl and the engagement portion of the hook are engaged.

2. A lock apparatus of a seat for a vehicle according to claim 1, wherein
   when the hook is pivoted to the lock position at which the striker is engaged with the first groove portion and the second groove portion, the striker is positioned in a space defined by an inner end surface of the first groove portion and a rear side surface of the second groove portion which is formed at a rear side in the pivotal movement of the hook towards the lock position, and the pawl and the engagement portion of the hook are engaged in the pivotal movement of the hook towards the lock position at a rear position further than the rear side surface of the second groove portion.

3. A lock apparatus of a seat for a vehicle according to claim 1, wherein
the first biasing member includes a spring provided between the cam member and the hook for biasing the cam member to pivot in the direction in which the cam profile presses the operational portion of the hook and for biasing the hook towards the unlock position.

4. A lock apparatus of a seat for a vehicle according to claim 3, wherein a first inclined surface is formed at an inner end surface of the first groove portion inclining from a cross position between the inner end surface and a path of the striker in the first groove portion towards an opening of the first groove portion relative to a direction perpendicular to the path of the striker.

5. A lock apparatus of a seat for a vehicle according to claim 4, wherein
the first inclined surface is formed at both sides of the cross position at the inner end surface of the first groove portion.

6. A lock apparatus of a seat for a vehicle according to claim 1, wherein a first inclined surface is formed at an inner end surface of the first groove portion inclining from a cross position between the inner end surface and a path of the striker in the first groove portion towards an opening of the first groove portion relative to a direction perpendicular to the path of the striker.

7. A lock apparatus of a seat for a vehicle according to claim 6, wherein
the first inclined surface is formed at both sides of the cross position at the inner end surface of the first groove portion.

8. A lock apparatus of a seat for a vehicle according to claim 7, wherein
an inclined angle of the first inclined surface is equal to or larger than a frictional angle between the striker and the first groove portion.

9. A lock apparatus of a seat for a vehicle according to claim 7, wherein a second inclined surface is formed at a rear side surface of the second groove portion inclining towards the opening of the first groove portion when the hook is positioned at the lock position by an inclined angle being lower than an inclined angle of the first inclined surface.

10. A lock apparatus of a seat for a vehicle according to claim 6, wherein
an inclined angle of the first inclined surface is equal to or larger than a frictional angle between the striker and the first groove portion.

11. A lock apparatus of a seat for a vehicle according to claim 10, wherein a second inclined surface is formed at a rear side surface of the second groove portion inclining towards the opening of the first groove portion when the hook is positioned at the lock position by an inclined angle being lower than an inclined angle of the first inclined surface.

12. A lock apparatus of a seat for a vehicle according to claim 6, wherein a second inclined surface is formed at a rear side surface of the second groove portion inclining towards the opening of the first groove portion when the hook is positioned at the lock position by an inclined angle being lower than an inclined angle of the first inclined surface.

13. A lock apparatus of a seat for a vehicle according to claim 6, wherein at least one of the cam member and the pawl is integrally provided with its rotational shaft.

14. A lock apparatus of a seat for a vehicle according to claim 6, wherein the third rotational shaft of the cam member and the second rotational shaft of the pawl are positioned to be away from each other for separately locating the cam member and the pawl in a thickness direction thereof.

15. A lock apparatus of a seat for a vehicle according to claim 1, wherein at least one of the cam member and the pawl is integrally provided with its rotational shaft.

16. A lock apparatus of a seat for a vehicle according to claim 1, wherein the third rotational shaft of the cam member and the second rotational shaft of the pawl are positioned to be away from each other for separately locating the cam member and the pawl in a thickness direction thereof.

* * * * *